US012576831B2

(12) United States Patent
Lauer et al.

(10) Patent No.: US 12,576,831 B2
(45) Date of Patent: Mar. 17, 2026

(54) COASTING OPERATION FOR A VEHICLE WITH A HYBRID DRIVE

(71) Applicant: Vitesco Technologies GmbH, Regensburg (DE)

(72) Inventors: Stefan Lauer, Munich (DE); Srinivasa Sunil Reddy, Munich (DE); Simon Baensch, Munich (DE); Magdalena Vieracker, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 172 days.

(21) Appl. No.: 17/787,375

(22) PCT Filed: Dec. 17, 2020

(86) PCT No.: PCT/EP2020/086861
§ 371 (c)(1),
(2) Date: Jun. 20, 2022

(87) PCT Pub. No.: WO2021/123046
PCT Pub. Date: Jun. 24, 2021

(65) Prior Publication Data
US 2023/0018941 A1      Jan. 19, 2023

(30) Foreign Application Priority Data
Dec. 19, 2019     (DE) ..................... 10 2019 220 218.7

(51) Int. Cl.
*B60W 20/40*          (2016.01)
*B60K 6/387*          (2007.10)
*B60W 30/18*          (2012.01)
(52) U.S. Cl.
CPC ............. *B60W 20/40* (2013.01); *B60K 6/387* (2013.01); *B60W 30/18072* (2013.01);
(Continued)

(58) Field of Classification Search
CPC ........... B60W 20/40; B60W 30/18072; B60W 2520/10; B60W 2530/10; B60W 2555/20;
(Continued)

(56) References Cited

U.S. PATENT DOCUMENTS 9,707,954 B2 *  7/2017  Fuechtner ................ B60K 6/48
10,882,512 B2   1/2021  Kobler et al.
(Continued)

FOREIGN PATENT DOCUMENTS

| | | | |
|---|---|---|---|
| CN | 108698499 A | 10/2018 | ............... B60K 6/30 |
| CN | 108698590 A | 10/2018 | ............... B60K 6/48 |
| JP | 2014092190 A | * 5/2014 | |

OTHER PUBLICATIONS

Search Report for International Application No. PCT/EP2020/086861, 11 pages.

(Continued)

*Primary Examiner* — Rodney A Butler
(74) *Attorney, Agent, or Firm* — Slayden Grubert Beard PLLC

(57)          ABSTRACT

Various embodiments include a method for operating a hybrid drive train for a motor vehicle having an output shaft from an internal combustion engine releasably connected to a shaft of an electric traction machine via a first clutch, wherein the shaft of the electric traction machine is releasably connected to a transmission input shaft via a second clutch. The method may comprise: determining a state parameter for the motor vehicle; and opening either the first clutch or the second clutch for a changeover to coasting operation of the hybrid drive train based on a function of one or more state parameters.

9 Claims, 3 Drawing Sheets

(52) U.S. Cl.
CPC ..... *B60W 2520/10* (2013.01); *B60W 2530/10*
(2013.01); *B60W 2555/20* (2020.02)

(58) Field of Classification Search
CPC ............. B60W 2552/05; B60W 20/11; B60W
2552/40; B60W 20/12; B60W 20/20;
B60W 50/082; B60W 2030/1809; B60W
2540/043; B60W 2552/20; B60W
2556/50; B60W 2710/021; B60W 10/02;
B60W 10/06; B60W 10/08; B60W
30/18127; B60K 6/387; B60K 2006/4825;
B60K 6/48; Y02T 10/60; Y02T 10/62
See application file for complete search history.

(56) References Cited

U.S. PATENT DOCUMENTS

| | | | |
|---|---|---|---|
| 2013/0040778 A1 | 2/2013 | Schulte et al. ................... | 477/5 |
| 2014/0058597 A1* | 2/2014 | Park ...................... | F01N 11/007 |
| | | | 701/67 |
| 2017/0151951 A1* | 6/2017 | Jeon ...................... | B60W 10/02 |
| 2018/0050686 A1 | 2/2018 | Atluri .................. | B60W 20/40 |
| 2019/0184961 A1* | 6/2019 | Gierling ............... | B60W 10/06 |
| 2019/0232950 A1* | 8/2019 | Atluri .................... | H04W 4/02 |

OTHER PUBLICATIONS

European Office Action, Application No. 20838941.1, 6 pages, Oct.
24, 2024.
Chinese Office Action, Application No. 202080088621.3, 13 pages,
Oct. 28, 2024.

\* cited by examiner

COASTING OPERATION FOR A VEHICLE WITH A HYBRID DRIVE

CROSS-REFERENCE TO RELATED APPLICATIONS

This application is a U.S. National Stage Application of International Application No. PCT/EP2020/086861 filed Dec. 17, 2020, which designates the United States of America, and claims priority to DE Application No. 10 2019 220 218.7 filed Dec. 17, 2020, the contents of which are hereby incorporated by reference in their entirety.

TECHNICAL FIELD

The present disclosure relates to vehicles. Various embodiments of the teachings herein include methods and/or systems for coasting operation for hybrid systems.

BACKGROUND

A hybrid system in a motor vehicle has both an internal combustion engine and an electric machine as a traction machine. Such hybrid drives are also referred to as hybrid electric drives. Both the electric machine and the internal combustion engine can each be used alone or together to drive the vehicle, and are therefore each referred to as traction machines. Systems in which the electric traction machine (E-machine) is arranged between the internal combustion engine and the transmission, with a respective clutch (K0) to the internal combustion engine and (K1) to the transmission, are referred to as P2 hybrid systems in this application. Such a hybrid system is shown, by way of example, in FIG. 1. The components with an electric machine located between the internal combustion engine and the transmission are sometimes also referred to as hybrid modules.

Coasting operation is often provided in modern vehicles in order to save fuel or energy consumption and emissions. In coasting operation, the drive train is open. In a P2 hybrid system, this can be done by opening the clutch K0 or alternatively the clutch K1. Both variants have different advantages and disadvantages. During coasting operation via an open K0 clutch, the K1 clutch remains closed. The electric machine is coupled to the transmission input shaft by the clutch K1 and runs together with it.

Advantages of coasting operation via an open clutch K0 (and closed K1 clutch) may include fast response times due to avoiding clutch changeover processes, e.g. when moving between coasting operation and purely electric driving. Synchronization can be dispensed with. Due to the closed K1 clutch, recuperation (recovery of braking energy by the electric machine) is also possible at any time during braking. When starting the internal combustion engine, the use of the rotational energy of the hybrid module and the electric machine leads to faster starting of the internal combustion engine.

The disadvantage of coasting operation via an open clutch K0 and a closed K1 clutch are increased frictional losses in the drive train due to the friction in the hybrid module since the electric machine is always also running. One advantage of K1 coasting with the K1 clutch open is correspondingly lower frictional loss. Known systems for coasting operation are fixed to one of the two clutches K1 or K0. That is to say, the same clutch is opened each time for coasting operation.

The teachings of the present disclosure include methods with which the disadvantages mentioned can be avoided.

For example, some embodiments include a method for operating a hybrid drive train (1) for a motor vehicle, in which an output shaft of an internal combustion engine (10) can be releasably connected to a shaft of an electric traction machine (11) via a first clutch (K0) and the shaft of the electric traction machine (11) in turn can be releasably connected to at least one transmission input shaft via at least one second clutch (K1), characterized in that the first clutch (K0) or the at least one second clutch (K1) is opened for a changeover to coasting operation of the hybrid drive train (1), wherein a decision as to which of the clutches (K1) or (K0) is opened is made as a function of one or more state parameters and the one or more state parameters (P) are determined before the changeover to coasting operation.

In some embodiments, the state parameter or parameters includes/include one or more vehicle parameters, environmental parameters, driver parameters and/or diagnosis parameters.

In some embodiments, vehicle parameters include one or more items of information about a vehicle speed (v), a vehicle mass (m) or a vehicle mode (M).

In some embodiments, an environmental parameter includes one or more items of information about a vehicle position, weather conditions and/or a roadway condition.

In some embodiments, a driver parameter includes at least one item of information about preferences of a current driver of the vehicle.

In some embodiments, at least one state parameter is compared with a prespecified threshold value.

As another example, some embodiments include a control device (21) in a motor vehicle with a hybrid drive train, in which an output shaft of an internal combustion engine (10) can be releasably connected to a shaft of an electric traction machine (11) via a first clutch (K0) and the shaft of the electric traction machine (11) in turn can be releasably connected to at least one transmission input shaft via at least one second clutch (K1), and which is designed to carry out one or more of the methods described herein.

As another example, some embodiments include a motor vehicle (20) with a hybrid drive train (1), in which an output shaft of an internal combustion engine (10) can be releasably connected to a shaft of an electric traction machine (11) via a first clutch (K0) and the shaft of the electric traction machine (11) in turn can be releasably connected to at least one transmission input shaft via at least one second clutch (K1), and a control device (21) as described herein.

BRIEF DESCRIPTION OF THE DRAWINGS

The teachings of the present disclosure are further explained below with reference to the figures, in which.

DETAILED DESCRIPTION

Figure 1:
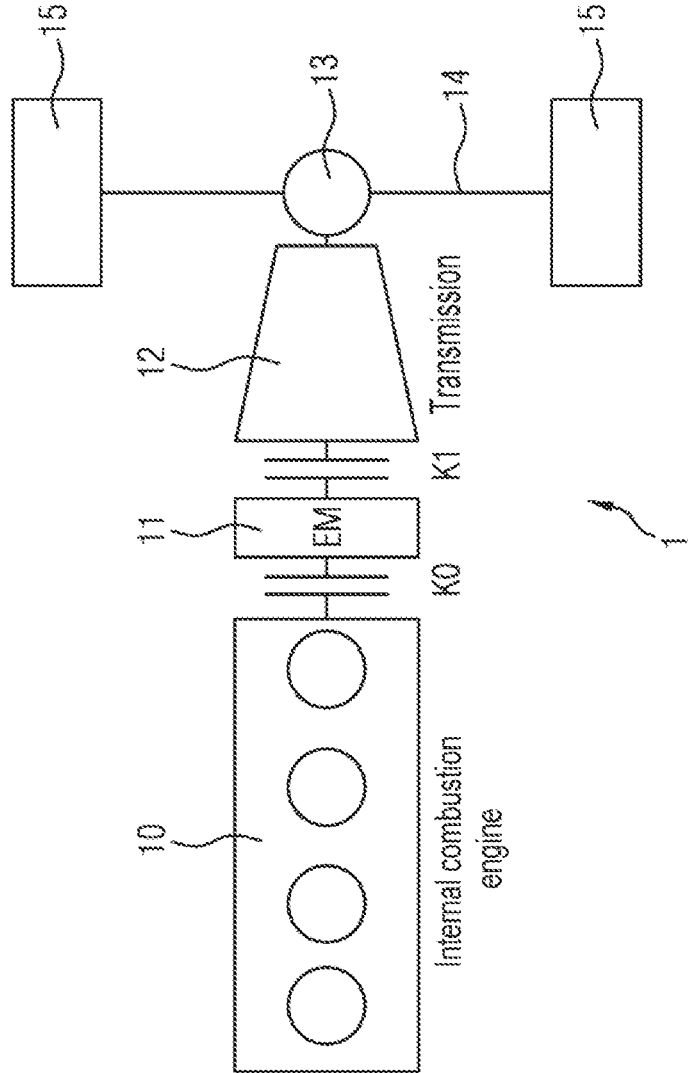
FIG. 1 is a drawing showing a P2 hybrid drive train for a motor vehicle for carrying out a method incorporating teachings of the present disclosure.
Figure 2:
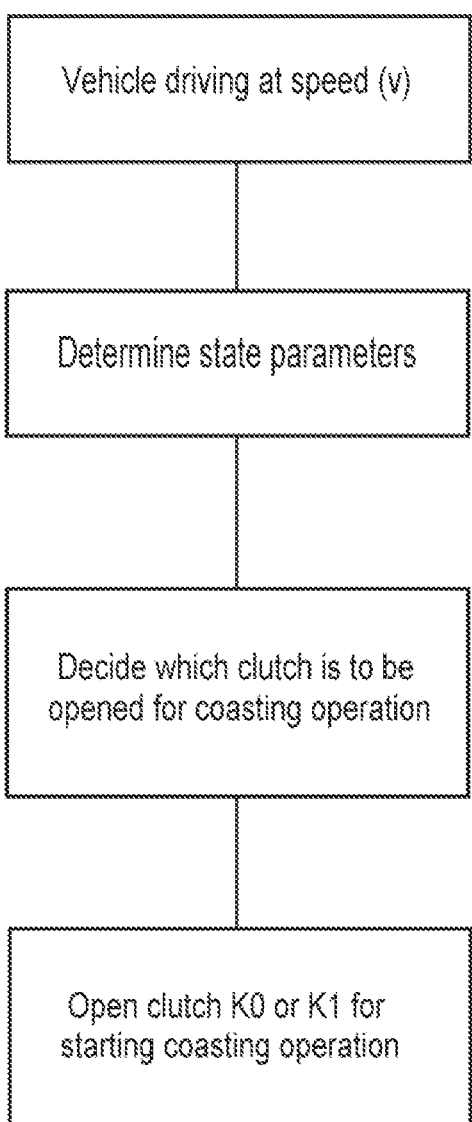
FIG. 2 is a flowchart showing the sequence of a method incorporating teachings of the present disclosure.

Some embodiments of the teachings herein include a method for operating a hybrid drive train for a motor vehicle, in which an output shaft of an internal combustion engine can be releasably connected to a shaft of an electric traction machine via a first clutch K0 and the shaft of the electric traction machine in turn can be releasably connected to at least one transmission input shaft via at least one second clutch K1, makes provision for the first clutch K0 or the at least one second clutch K1 to be opened for a changeover to coasting operation of the hybrid drive train, wherein a decision as to whether the first clutch K0 or the at least one second clutch K1 is opened is made as a function of one or more state parameters.

In the hybrid drive train, the shaft of the electric machine can be releasably connected to the output shaft of the internal combustion engine or the input shaft of the transmission directly or indirectly via the clutches K0 and K1. A direct connection can exist, for example, if the shafts run coaxially and the shafts are connected to one another directly via the clutches. However, for example, an arrangement is also possible in which the shaft of the electric machine is arranged parallel to the output shaft of the internal combustion engine. In that case, in addition to the clutch K1 or K0, the connection can be made indirectly via a belt drive or a gear stage.

The teachings herein can also be used for hybrid drive trains with dual clutch transmissions. In the case of hybrid drive trains with a dual clutch transmission, there may be two second clutches K1 and two transmission input shafts, which are then arranged in parallel, for example. In this case, both second clutches K1 are to be opened equally for coasting or other operation with the clutch K1 open. That is to say, both second clutches K1 are or will be opened. For coasting or other operation with the second clutch K1 closed, at least one of the two second clutches is or will then be closed. In some embodiments, however, there is usually only one second clutch K1 and one transmission input shaft.

Within the scope of this disclosure, all described measures relating to the second clutch K1 apply analogously to exemplary embodiments with a single second clutch K1 and a single transmission input shaft and also to embodiments with a dual clutch transmission with two transmission input shafts and two second clutches K1. In principle, embodiments with more than two second clutches K1 and transmission input shafts are also conceivable.

In some embodiments, either the first clutch K0 or the at least one second clutch K1 is therefore opened for coasting operation, wherein the decision as to which of the clutches is opened is made as a function of one or more state parameters.

One possible initial state for coasting operation is that the vehicle is moving at a speed (v) and is being driven by the electric machine and/or the internal combustion engine in a first operating mode. In this case, usually at least the second clutch (K1) is closed or both clutches (K1) and (K0) are closed. In principle, however, the methods are also possible from when the vehicle is stationary, for example if it begins rolling down a slope. This can then also take place from a state in which clutch K1 is open.

K1 coasting (coasting with clutch K1 open) is more favorable in some situations. In other situations, K0 coasting (coasting with clutch K0 open) is more favorable. Coasting operation is therefore carried out either with the K0 clutch or with the K1 clutch, depending on the situation. The different situations are characterized by one or more state parameters. In some embodiments, the one or more state parameters (P) are determined before the changeover to coasting operation.

In principle, the methods are also possible starting from coasting operation that is already in progress. After a state parameter has been determined, a changeover between K0 coasting and K1 coasting can also take place, for example.

Therefore, provision can be made for the state parameter or state parameters to be continuously determined.

The state parameter or parameters can include one or more vehicle parameters, environmental parameters, driver parameters and/or diagnosis parameters. Vehicle parameters can include, for example, one or more items of information about a vehicle speed, a vehicle mass or a driving mode. An environmental parameter can include one or more items of information about a vehicle position, that is to say a location parameter, a weather condition and/or a roadway condition. A driver parameter includes, for example, information about the preferences of a current driver of the vehicle. For example, whether the driver prefers a sporty or an energy-efficient driving style. A diagnosis parameter can indicate, for example, whether one of the two clutches is defective and, for example, can no longer be opened.

In this case, a decision can be made on the basis of the diagnosis parameter that the other clutch has to be opened. Therefore, even in this case of failure, coasting operation is still possible as a fail-safe option. The diagnosis parameter is identified, for example, by a clutch control device. The clutch controller may be part of a hybrid module controller or a drive train controller.

In some embodiments, the one or more state parameters are compared with one or more prespecified threshold values in order to decide which clutch is to be opened for coasting operation. If several state parameters are taken into account, the various state parameters can be weighted, so that a uniform decision is made possible.

In some embodiments, the state parameter relates to a current vehicle speed v. For example, the vehicle speed may be compared to a predetermined threshold value. If the vehicle speed lies below the threshold value, the speed is low and the clutch K0 is opened for coasting operation. If the vehicle speed is above the threshold value, the clutch K1 is opened.

In the case of hybrid drives, low speeds generally mean a high proportion of purely electric driving, for which purpose K0 has be open in each case. In addition, low speeds also mean frequent changeovers between coasting operation, electric driving and hybrid driving with an internal combustion engine, that is to say rapid changes in state have to be possible. At high speeds, on the other hand, the proportion of electric driving is lower and the dynamics of the changes in state are less important, and therefore it makes sense to utilize the comparatively lower losses of K1 coasting.

In some embodiments, the vehicle position is considered as a state parameter. If the vehicle is located in a town, for example in city traffic, K0 coasting is selected since it is usually driven at lower speeds and there may also be more frequent changes in state. In interurban traffic, out of town and on highways, K1 coasting may be used since the vehicle is usually driven at higher speeds here.

K0 coasting is used in "zero emission zones" (that is to say traffic zones in which no emissions may be emitted) since the internal combustion engine must not be started at all. That is to say, only electric driving and coasting are used in such zones. The vehicle position can be determined, for example, using a satellite-based positioning system, such as GPS for example.

In some embodiments, a driving mode can be considered as a state parameter. For example, an ECO (energy-efficient) mode can be selected in a vehicle, depending on the driver's preference. In this case, K1 coasting operation is preferably used since the electric machine and the hybrid module do not rotate together here, this leading to lower frictional losses.

If, on the other hand, an air-conditioning mode or a performance mode (that is to say higher drive performance is desired) is selected in the vehicle, K0 coasting is preferably selected. In performance mode, for example, the driver wants high dynamics in the event of changes in state (that is to say a shorter response time). K0 coasting may be used in this case.

K0 coasting may be used in the air-conditioning mode: If a mechanical air-conditioning compressor is mounted parallel to the electric machine on or in the hybrid module, the air-conditioning system can also be driven using the vehicle mass during K0 coasting.

The state parameter can also relate to a driver parameter. For example, a specific driver can be recognized in the vehicle by means of a driver recognition function. Said driver may have, for example, certain preferences for driving operation, similarly to the case in a fixed selected driving mode. If an economical driver is recognized (even temporarily), K1 coasting is preferably selected for the same reasons as described above for the ECO mode. Otherwise, K0 coasting is preferred. In contrast to a fixed selected driving mode, the preferences of a specific driver can be different for different types of roads or in and out of town, for example. A location parameter (environmental parameter) can then preferably be taken into account in addition to the driver parameter for making the decision as to which of the clutches is to be opened during coasting operation.

Another environmental parameter can relate to a roadway condition, which can be characterized, for example, by a coefficient of friction. With a low coefficient of friction, for example in winter or when the roadway is wet or dirty, K0 coasting may be used. K0 coasting minimizes the number of clutch changeover processes. Clutch changeover processes also mean a non-uniform torque profile at the wheel, which could lead to a loss of wheel grip in the event of a low coefficient of friction on the road. The decision as to which clutch is to be opened for coasting operation can then be made, for example, by way of comparing the coefficient of friction of the road with a prespecified threshold value. If the coefficient of friction lies below the threshold value, K0 coasting is selected.

Another possible state parameter is the vehicle weight. In the case of a vehicle with a high mass, K0 coasting may be selected downhill and on the flat since (power) losses play a smaller role here. Here, too, the vehicle weight can be compared with a prespecified threshold value, for example.

Some embodiments of the teachings herein include a control device in a motor vehicle with a P2 hybrid drive train, which is designed to carry out one or more of the methods described herein. The control device can be, for example, a controller of the entire drive train or a separate control unit for the hybrid module.

FIG. 1 shows a P2 hybrid drive train (1). The internal combustion engine (10) is connected to the electric traction machine (11) via a clutch (K0). The clutch (K0) is arranged between the electric traction machine (11) and the transmission (12). The driving force is transmitted from the transmission (12) to the axle (14) and the wheels (15) via a differential (13).

In some embodiments of the teachings herein, the vehicle is driving at a speed v. A state parameter is determined before coasting operation begins. The state parameter is used to decide whether clutch K1 or K0 should be opened for coasting operation. In the last step, the opening K0 or K1 is opened to start coasting operation.

Figure 3:
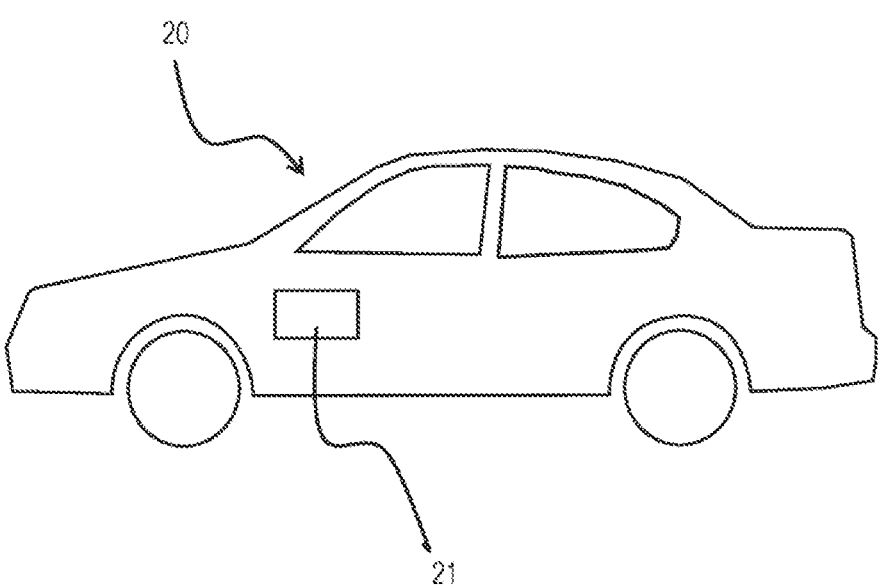
FIG. 3 is a drawing showing a motor vehicle with a P2 hybrid drive train and a control device for carrying out a method incorporating teachings of the present disclosure.

FIG. 3 shows a motor vehicle with a controller incorporating teachings of the present disclosure. The vehicle also comprises a drive train according to FIG. 1 (not shown in FIG. 3).

What is claimed is:

1. A method for operating a hybrid drive train for a motor vehicle having an output shaft from an internal combustion engine releasably connected to a shaft of an electric traction machine via a first clutch, wherein the shaft of the electric traction machine is releasably connected to a transmission input shaft via a second clutch, the method comprising:

determining a state parameter for the motor vehicle; and opening only one of either the first clutch or the second clutch for a changeover to coasting operation of the hybrid drive train based on a function of one or more state parameters;

wherein the state parameter is selected from a group consisting of: a vehicle mass, a traffic condition related to the geographical position of the vehicle, a weather condition, a coefficient of friction between the roadway and the vehicle, a preference of a driver, and a defect in one of the first and second clutches.

2. The method as claimed in claim 1, wherein the state parameter is determined before the changeover to coasting operation.

3. The method as claimed in claim 1, further comprising comparing the state parameter with a prespecified threshold value.

4. A control device in a motor vehicle with a hybrid drive train having an output shaft of an internal combustion engine releasably connected to a shaft of an electric traction machine via a first clutch, wherein the shaft of the electric traction machine is releasably connected to at least one transmission input shaft via a second clutch, the control device comprising:

a memory storing a set of instructions; and a processor in communication with memory;

wherein the set of instructions, when loaded and executed by the processor, cause the processor to:

determine a state parameter for the motor vehicle; and open only one of either the first clutch or the second clutch for a changeover to coasting operation of the hybrid drive train based on a function of one or more state parameters;

wherein the state parameter is selected from a group consisting of: a vehicle mass, a traffic condition related to the geographical position of the vehicle, a weather condition, a coefficient of friction between a roadway and the vehicle, a preference of a driver, and a defect in one of the first and second clutches.

5. A motor vehicle comprising:

an internal combustion engine;

an electric traction machine;

a first clutch releasably connecting an output shaft of the internal combustion engine to a shaft of the electric traction machine; and a second clutch releasably connecting the shaft of the electric traction machine to a transmission input shaft; and a control device comprising: a memory storing a set of instructions, and a processor in communication with memory;

wherein the set of instructions, when loaded and executed by the processor, cause the processor to:

determine a state parameter for the motor vehicle; and open only one of either the first clutch or the second clutch for a changeover to coasting operation of the hybrid drive train based on a function of one or more state parameters;

wherein the state parameter is selected from a group consisting of: a vehicle mass, a traffic condition related to geographical position of the vehicle, a weather condition, a coefficient of friction between a roadway and the vehicle, a preference of a driver, and a defect in one of the first and second clutches.

6. The motor vehicle as claimed in claim 5, wherein the state parameter is determined before the changeover to coasting operation.

7. The motor vehicle as claimed in claim 5, wherein the set of instructions cause the processor to compare the state parameter with a prespecified threshold value.

8. The control device as claimed in claim 4, wherein the state parameter is determined before the changeover to coasting operation.

9. The control device as claimed in claim 4, wherein the set of instructions cause the processor to compare the state parameter with a prespecified threshold value.

* * * * *